United States Patent [19]
Ecker et al.

[11] Patent Number: 5,396,573
[45] Date of Patent: Mar. 7, 1995

[54] PLUGGABLE CONNECTORS FOR CONNECTING LARGE NUMBERS OF ELECTRICAL AND/OR OPTICAL CABLES TO A MODULE THROUGH A SEAL

[75] Inventors: Mario E. Ecker; Lawrence Jacobowitz, both of Poughkeepsie; Casimer M. DeCusatis, Lake Katrine, all of N.Y.

[73] Assignee: International Business Machines Corporation, Armonk, N.Y.

[21] Appl. No.: 101,120

[22] Filed: Aug. 3, 1993

[51] Int. Cl.6 .............................................. G02B 6/36
[52] U.S. Cl. ...................... 385/88; 385/94; 385/89
[58] Field of Search ............................ 385/88–94; 439/434, 485, 738

[56] References Cited

U.S. PATENT DOCUMENTS

| | | | |
|---|---|---|---|
| 4,322,127 | 3/1982 | Comerford et al. | 385/65 |
| 4,553,813 | 11/1985 | McNaughton et al. | 385/89 |
| 4,553,814 | 11/1985 | Bahl et al. | 385/86 |
| 5,155,786 | 10/1992 | Ecker et al. | 385/94 |
| 5,173,668 | 12/1992 | Jacobowitz et al. | 333/156 |
| 5,272,754 | 5/1993 | Basavanhally et al. | 385/88 |

Primary Examiner—Rodney B. Bovernick
Assistant Examiner—Phan Thi Heartney
Attorney, Agent, or Firm—Bernard M. Goldman

[57] ABSTRACT

Enables a large number of pluggable-array connectors to be used with a multi-chip module (MCM) by using a connector technique that does not require a significant amount of available surface area on a module. The array connectors provide a large increase in the input/output (I/O) capacity of a module. Each of the connectors has a receptacle supported by a frame around the module, and short flexible transmission lines connect the receptacle to the module. A plug connects a cluster (array) of external transmission lines, which may be optical and-/or electrical transmission lines operating in parallel. Optical transmission lines may have optical/electrical transducers mounted on either the frame or module. Frame mounting of optical transducers with a connector receptacle enables a connector to transfer only electrical signals between the connector and the module, regardless of a mix of optical and electrical transmission lines to the same connector plug.

21 Claims, 6 Drawing Sheets

PLUGGABLE CONNECTORS FOR CONNECTING LARGE NUMBERS OF ELECTRICAL AND/OR OPTICAL CABLES TO A MODULE THROUGH A SEAL

CROSS REFERENCED PATENT APPLICATIONS AND PATENTS

This patent application is being filed concurrently with the following related patent applications:

U.S. Pat. No. 5,333,225 entitled "Substrate-Embedded Pluggable Receptacles For Connecting Clustered Optical Cables To A Module", Ser. No. 08/101,121 (PO9-93-023) entitled "Substrate-Embedded Pluggable Receptacles For Connecting Clustered Electrical Cable To A Module", and U.S. Pat. No. 5,337,388 entitled "Matrix of Pluggable Connectors for Connecting Large Numbers of Clustered Electrical and/or Optical Cables to a Module". Inventorship and assignee of each of these related applications is the same as the inventorship and assignee of the subject application.

Previously filed pertinent applications and issued patents by some of the joint inventors on the subject application include: Ser. No. 07/893,173 (FI9-90-001X) entitled "Apparatus and a Method for an Optical Fiber Interface" by L. Jacobowitz and M. E Ecker now U.S. Pat. No. 5,241,614 and, Ser. No. 07/951,741 (FI9-91-053X) entitled "Apparatus and a Method for an Electrical Transmission-Line Interface" by M. E. Ecker and L. Jacobowitz now U.S. Pat. No. 5,304,969, U.S. Pat. No. 5,155,786 (FI9-90-001) entitled "Apparatus and a Method for an Optical Fiber Interface" by L. Jacobowitz and M. E. Ecker, and U.S. Pat. No. 5,173,668 (FI9-91-053) entitled "Apparatus and a Method for an Electrical Transmission-Line Interface" by M. E. Ecker and L. Jacobowitz.

The disclosures of all of the above applications and patents are incorporated by reference herein.

INTRODUCTION

This invention relates to providing a large number of input/output (I/O) connectors for a multi-chip module (MCM) for which the number of connectors is not limited by available surface area for chip sites or by available area on the edge of the module. The transmission line array connectors attach externally to the module, so they do not occupy a significant area within the module. Each of the connectors contains a large number of parallel transmission lines (optical and/or electrical) for connection to the MCM.

BACKGROUND OF THE INVENTION

Technology requirements are continually increasing the numbers of I/O connections needed on MCMs. This is primarily due to increases in the number of VLSI (very large system integration) chips mounted on an MCM, and to increases in the number of circuits per chip, resulting in an increase in circuit packaging density for an MCM.

In this specification, the term "module" includes several levels of packaging, as follows: A "substrate" is the inner-most part of a module; in the preferred embodiment the substrate is primarily silicon or glass-ceramic. A "chip carrier" is a substrate having semiconductor chips placed thereon in a module, and the chip carrier is a higher level of packaging than the substrate. A "housing" is a frame around the chip carrier to seal or protect the chip carrier and is the outer-most part of a module. In the preferred embodiment described herein, the "module" encompasses a substrate, a chip carrier, and a housing, although at times the term module may be used to refer to one of these parts. A module may be refer to as either a single-chip module or multi-chip module (MCM) according to whether its contained chip carrier has single or multiple chips (i.e. a module may contain one or more chips). An example is the commercially-used thermal conduction module (TCM) constructed with alumina substrates, which is a form of MCM. An upper major surface of the TCM is covered with a thermal cooling structure, and the other major surface is covered with conductive I/O (input/output) pins which are used to plug the module into a computer framework. The substrate in a TCM is constructed with many internal layers of wiring to accommodate the interconnections among multiple chips on the upper substrate surface. The TCM has a thin, low profile shape to support internal cooling in the TCM. Direct contact heat sinks are used. The low profile chip carrier in the module having small edge surfaces compared to the top and bottom surfaces of the chip carrier. The module does not have sufficient area on any surface to provide a desired number of conventional pin-in-hole type connectors, and the narrow edges of the TCM do not contain any conductive I/O pins.

An example is the air-cooled thermal conduction module (TCM) constructed with alumina substrates, which is a form of MCM. An upper major surface of the TCM is covered with a thermal cooling structure, and the other major surface is covered with conductive I/O pins which are plugged into a computer framework. The TCM is constructed with many internal layers of wiring to accommodate the interconnections among the chips on the upper TCM surface. The TCM needs only a thin, low-profile shape to contain all needed layers of wiring,and the module shape is also needed to support internal cooling in the TCM. Direct contact heat sinks are used. The result is a low profile module having small edge surfaces compared to the top and bottom surfaces of the module. The TCM does not have sufficient area on any side to provide the desired number of conventional pin-in-hole type connectors, and the narrow edges of the TCM are not used to contain conductive I/O pins.

Prior art connectors, such as disclosed in U.S. Pat. No. 4,553,813 (McNaughton et al), do not disclose any multi-transmission-line array connector, nor any alignment means feasible for an array connector. Also, U.S. Pat. No. 4,553,813 does not provide any connector which can intermix different types of transmission lines, such as optical and electrical, or intermix different types of array connectors for the same module. Further, the connector type in U.S. Pat. No. 4,553,913 cannot connect to a module the large number of transmission lines connectable by the subject invention to an MCM.

This invention provides a means for effecting a pluggable matched impedance connection capability along the top surface of a multilayer ceramic substrate. It employs a unique silicon contact actuation structure coupled to a flexible printed circuit member with an integral elastomeric seal ring. The printed transmission lines thereon terminate to metallic balls soldered to pads on the printed flexible cable which in turn are soldered to pads on a coordinate grid of the MCM substrate.

SUMMARY OF THE INVENTION

This invention enables a significant increase in the number of I/Os for an MCM (and particularly for a TCM type of MCM) by supporting pluggable connectors in a frame around an MCM and using through-the-seal wiring between the frame mounted connectors and the MCM, in which the wiring passes through a seal protecting the MCM from outside contamination. The connector receptacles may be permanently fastened to the MCM frame. A significant advantage of this arrangement is that the frame-mounted connectors do not take up space within the MCM (where available space may be non-existent since it is required for chip attachment or other functions), enabling a large number of additional I/O connectors to service the MCM. Each of these connectors is a multi-line connector which connects a large number of transmission lines. Each of the transmission lines in a connector provides at least one effective I/O connection to the MCM, so that a large number of effective I/O connections are provided to the MCM; the effective number of I/Os is the number of transmission lines per connector multiplied by the number of connectors. Where modulation techniques are used to enable an single transmission line to handle multiple parallel signals, a single transmission line may provide a plurality of effective I/O connections for the MCM.

With this invention, each of the frame-mounted multi-transmission line connectors may connect to either electrical or optical transmission lines, or any of these connectors may be a hybrid connector for connecting a combination of electrical and optical transmission lines to the MCM. All of the frame-mounted multi-transmission line connectors of an MCM may provide the only connectors for an MCM, or they may be supplemental connectors for an MCM also having conventional pin connectors (such as on its bottom). These frame-mounted connectors may be used for data signals, clock signals, other types of signals, or for power distribution. These connectors are each comprised of a connector receptacle located in the wall of an MCM frame, and a receptacle which receives a disengagable plug supporting an array of transmission lines. The plugs may be disengaged at any time and re-plugged into different connector receptacles in an MCM's frame to reconfigure the transmission lines to the MCM. MCM testing is enhanced by unplugging all except one plug having its transmission line signals tested, which can greatly simplify the testing of failures in an MCM.

A preferred embodiment employs unique silicon receptacle structures mounted on a frame around an MCM which is sealed within the frame by an elastic (or elastomeric) seal between the MCM and the frame. Each frame-mounted receptacle is coupled to the MCM by a flexible fiber and/or electrical transmission line which passes through the elastic seal to an electrical connection or optical interface in the MCM. A relatively large number of optical and/or electrical transmission lines can be handled by each receptacle. A disconnectable plug engages the receptacle and supports a cable containing a plurality of transmission lines that are then connected to the MCM through aligned corresponding transmission lines in the receptacle.

Some of the important features of this invention may be summarized as:

1. A hybrid receptacle (combining both optical and electrical media) with multiple transmission lines of each type may be mounted in a frame around a multi-chip module for conveying digital information to the MCM.

2. Flexible transmission lines of the printed circuit type may be passed through an elastomer seal (which seals the MCM from the frame) between the frame-mounted connectors and the MCM.

3. A larger number of connectors can be accommodated in a frame around an MCM than can be accommodated directly in the edges of an MCM.

4. The frame-mounted connectors of this invention may be used to supplement pin-in-hole type connectors fastened on a bottom surface of an MCM.

5. The connectors in the subject invention may use a plug of the type described in co-related application Ser. No. 08/101,119 (PO9-93-021), now U.S. Pat. No. 5,333,225 Ser. No. 08/101,121 (PO9-93-023), or Ser. No. 08/101/118 PO9-93-024) now U.S. Pat. No. 5,337,388 having a cable containing a large numbers of transmission lines.

6. Inexpensive silicon semiconductor materials and processes may be used to make the receptacle and plug in the preferred embodiments of this invention.

OBJECTS OF THIS INVENTION INCLUDE:

1. To increase the number of I/O connectors and/or effective I/O bandwidth for an MCM over the number allowed by other techniques for providing I/O connectors for an MCM.

2. To provide a frame-mounted connector for a large number of transmission lines each having a receptacle fastened to the frame of an MCM and providing a matched impedance to each of multiple transmission lines in an engagable plug, in which the transmission lines may be optical fibers, electrical coaxial lines, twisted pair wires, flexible printed wires, and/or discrete wires.

3. To provide connectors external to an MCM which are connected to wiring in an MCM at an available point, such as along an upper surface or along one or more edges of an MCM, so as not to affect any chip-mounting area, air-cooling area, or I/O pin area on an MCM.

4. To be able to use etched silicon elements to form densely spaced receptacle and plug elements comprising each frame-mounted connector of this invention.

5. To intermix different types of transmission lines within a single hybrid frame-mounted connector.

6. To intermix different types of frame-mounted connectors (optical, electrical, or both) in an MCM frame. Thus, some connectors may have only electrical transmission lines, other connectors may have only optical transmission lines, and still other connectors may have a hybrid intermixture of both electrical and optical transmission lines.

BRIEF DESCRIPTION OF DRAWINGS

The invention may best be understood with reference to the accompanying drawings in which.

DETAILED DESCRIPTION OF THE INVENTION

A coaxial cable connector plug 8 supports an end of a cluster cable 15 containing a large number of copper coaxial cables. Plug 8 is easily engagable and disingagable with a receptacle fixed within a well 7 located in a metal frame surrounding an air-cooled TCM. When engaged, the plug/receptacle combination provides a flat structure having a low-profile which does not interfere with thermal cooling structures mounted on the frame.

Figure 2:
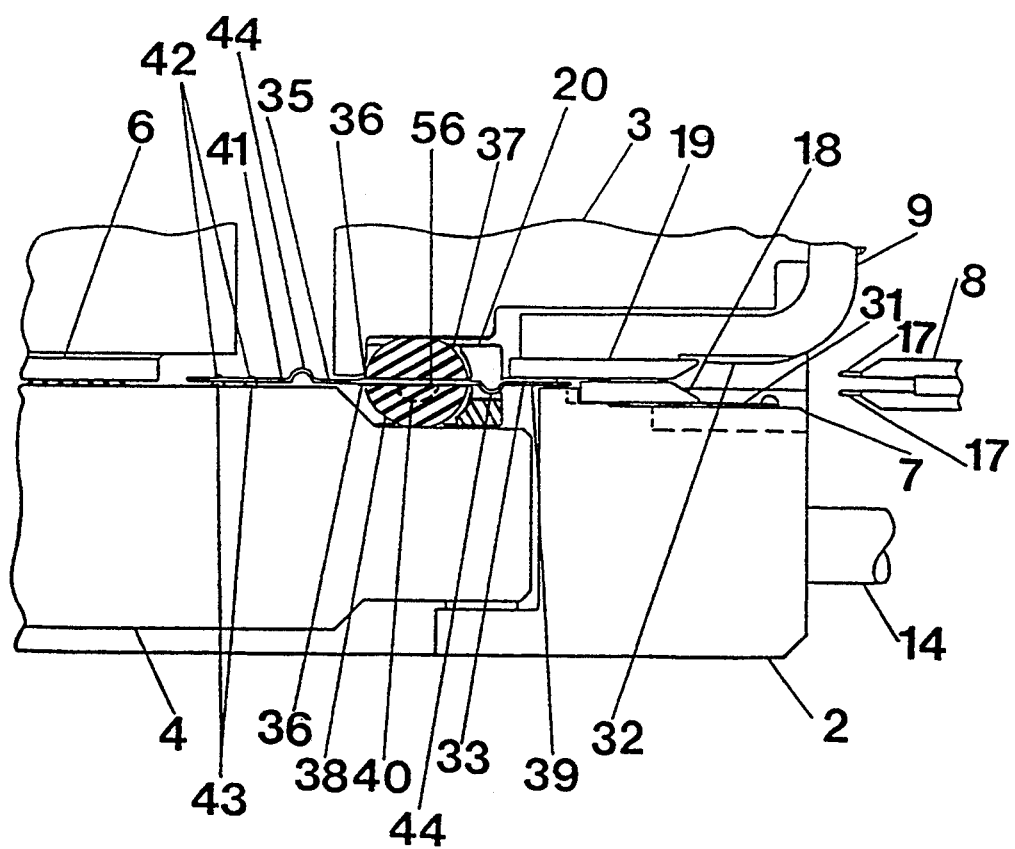
FIG. 2 is an enlarged cross-sectional view of mated connector members prior to full insertion by a cam actuation mechanism, part of the lower TCM frame.

FIG. 2 shows a cross-section of the plug and receptacle. The receptacle is assembled from parts 18 and 19 which have copper wires which passes through a perimeter housing seal 39 to a TCM 4 and provide a direct electrical path to internal TCM wiring. The receptacle is formed of a silicon structure external to the sealed TCM with a low-profile side entry in the frame surrounding the TCM to connector solution.

Figure 1:
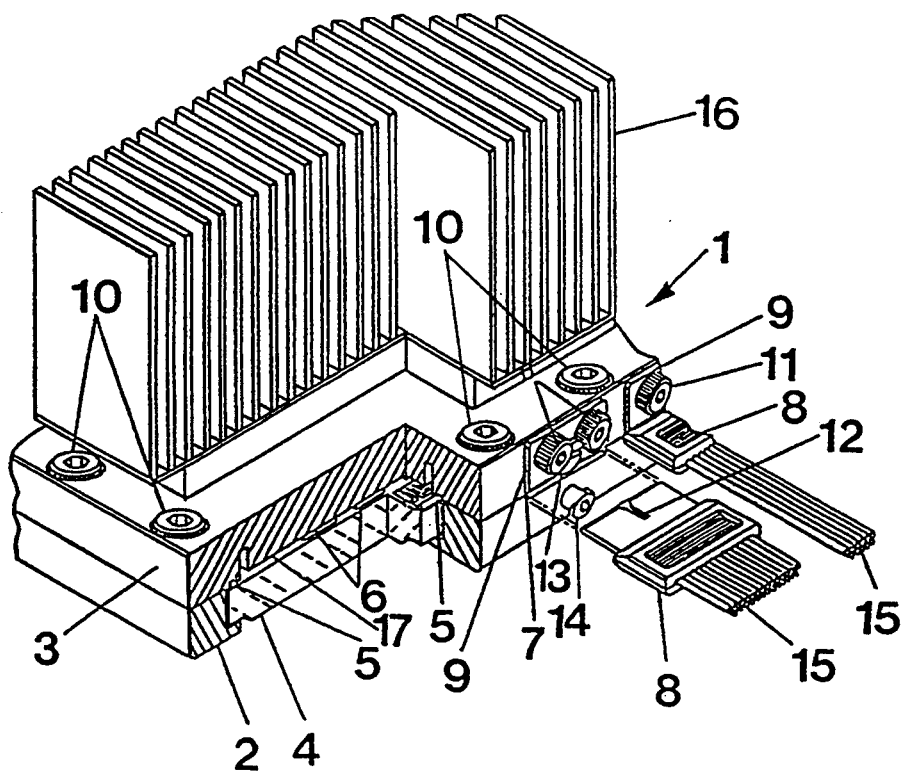
FIG. 1 is a cut-away perspective view of an air-cooled TCM illustrating the pluggable member of the connector system in the mated and unmated position.

A large number of coaxial cluster cables may be connected to a TCM by a corresponding number of these plug/receptacle combinations located around on each of the four sides of the metal frame surrounding the TCM, of which two plug/receptacle combinations are shown in FIG. 1.

In more detail, FIG. 1 illustrates a partially sectioned air-cooled TCM comprising a lower frame 2, an upper frame 3 with a direct coupled heat sink 16 that provides a multi-chip substrate protective enclosure when bolted together by bolts 10 with the through-seal interface 5 in place. Semiconductor chips 6, are in contact with the bottom surface of heat sink coupling plate 17. A well 7 for receiving pluggable contact cluster assembly 8 is formed in lower frame 2. A laterally adjustment bracket 9 is contained in well 7 and has a reference surface 9 which is at right angle to the part of bracket 9 contained in well 7. The reference surface of lateral adjustment bracket 9 is attached to upper frame 3 by cap screws 11. Suitable alignment pins in the upper frame 3, not shown, secure the position of well 7 when lower frame 2 and upper frame 3 are held together with bolts 10, spaced about the perimeter of frame members 2 and 3.

The reference surface of lateral adjustment bracket 9 has a protrusion which engages a guide slot 12 in a pluggable connector assembly 8.

Lateral adjustment is effected by loosening cap screws 11, rotating an eccentric cam 13 to make the lateral adjustment by the protrusion of right angle bracket 9 laterally pushing slot 12 in plug 8 to laterally move plug 8 within well 7. Then, cap screws 11 is re-tightened.

To engage pluggable connector assembly 8 to a frame mounted silicon contact actuation structure, not shown, plug assembly 8 is inserted in well 7 until it contacts the silicon actuation structure. The radial segment cam 14 is rotated an appropriate clockwise amount with a suitable tool to fully engage the plug 8 to contact lands to complete the electrical path between the group of coaxial cables 15 and the TCM substrate internal wiring.

FIG. 2 shows an enlarged cross-sectional view of plug assembly 8 mounted in well 7 between frames 2 and 3. During insertion of pluggable assembly 8 in slot 7, cantilever spring 31 is compressed to force the forward part of pluggable connector assembly 8 against the reference surface of bracket 9 to maintain engagement of protrusion 32 in guide slot 12. This aligns bi-level cantilever contacts 17 with contact lands on the angled edges 18 of silicon actuation structure 19. Referring to FIG. 1, clockwise rotation of radial cam 14 fully engages pluggable connector assembly 8.

Silicon contact actuation member 19 is soldered to pad array 33 on external tab 39 of the through-seal interface. The through-seal interface is comprised of a flexible printed circuit member 35 that is continuous about the perimeter of substrate 4. Continuous lands 36 on both surfaces of flexible circuit member 35 provide rigidity and an adhesive bonding surface for upper and lower elastomeric seal elements 37 and 38, respectively. Continuous seal member 37 has a hemispherical protrusion 39 periodically disposed along its length. Seal element 38 has a corresponding periodic complementing cavity 40 disposed on similar spacing along its length. The hemispherical protrusions engage matching cavities through openings in continuous land 36 and flexible circuit member 35 during adhesive bonding of the upper and lower seal members to lands 36. This ensures alignment of the seal members as well as provide shear resistance during compression of the seal member.

The internal tab member 41 of the through-seal interface contains a pad group 42 with spheres similarly soldered as those on the external tab 39. Pad group 42 is soldered to corresponding pad group 43 on the surface of substrate 4, using a eutectic Pb-Sn alloy. This interface provides an electrical path between contacts 17 of pluggable member 8 and the internal wiring on or in substrate 4.

Convolutions 44, either side of seal member 36 and 37 provide stress relief during handling of externally mounted silicon contact actuation structures 19, or seal distortion during compression.

Figure 3:
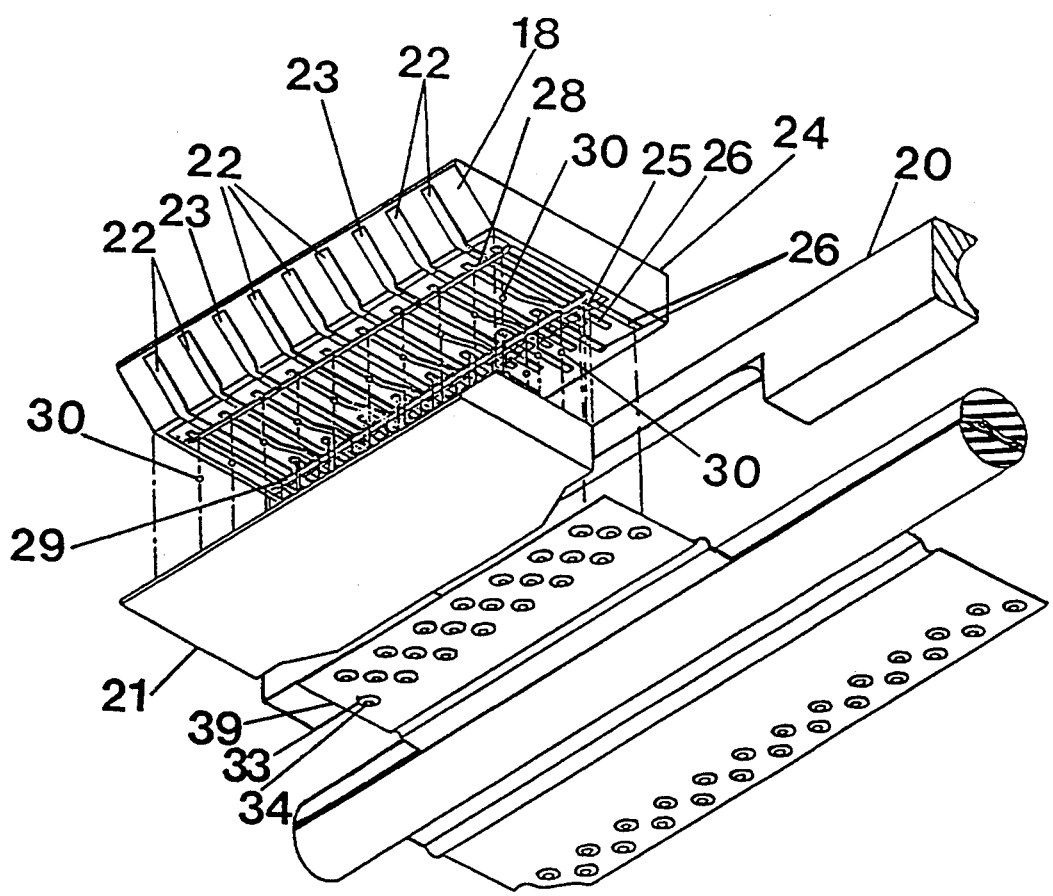
FIG. 3 shows an exploded view of the embedded silicon contact actuation structure with a segment of the through-seal connector interface.

FIG. 3 is an exploded view of silicon contact actuation structure 19. The structure is comprised of two silicon chips processed to provide a high density, impedance matched electrical connector capable of being located in lower frame 2 of an air-cooled TCM.

The Upper silicon platform 24 has suitably spaced contact lands 22 and 23 disposed along angled edge 18. Similar contact lands are disposed along the angled edge of the lower silicon platform 21, except they are off set by ½ a land pitch. The ½ pitch off set between opposed contact lands permit cantilever contacts 17 to deflect along the lands to a common centrality without shorting to one another. The off-set also disposes a ground pathway opposite each signal land 22 so that predetermined separation of platforms 21 and 24 by copper balls 30 effects a printed transmission line for signal paths 22.

Contact lands 23 are ground contacts and 22, signal contacts. Lands 22 and 23 extend to the rear of upper platform 24. Ground reference paths 25 are disposed between paths 22 and 23 to minimize cross talk between signal paths 22. The short lands 26 are subsequently connected to a similarly deposited electrical wiring pattern on the underside of the lower platform 21. Lands 26 are used to transfer paths 22 and 23 from the underside of upper platform 24 to the top surface of platform 21 using copper balls 30.

The silicon platforms 21 and 24 are batch fabricated in a semiconductor chip line. The angled edges are v-grooves at this stage, preferentially etched in the 100 plane to achieve a 57 degree side wall angle.

Contact lands 22 and 23 and other related wiring paths are photolithographically produced after the silicon surface is oxidized. A quartz or other suitable insulator is selectively deposited over the connector pattern. Openings are created in the quartz to permit connection to ground straps 28, 29 and copper spheres 30. Ground straps 28 and 29 connect all ground reference elements 23 and 25. After dicing, placement of copper spheres and subsequent soldering to appropriate points on platforms 21 and 24 the connector assembly 19 is complete. Copper sphere bonding is performed with a eutectic alloy, 73% Gold/27%Indium, with a liquidus/solidus temperature of 451 deg. C.

A segment of the through-seal interface is shown relative to silicon contact actuation member 19. The external tab 39 has a pad group 33 with copper spheres 34, soldered using 95% Pb/5% Sn alloy in appropriate openings in pad 33. Spheres 34 extend equally above and below the surface of flexible printed circuit member 35. Spheres 34 are registered with extremities of lands 25 and 26 on upper platform 24 and soldered using a eutectic Pb-Sn alloy.

Figure 4:
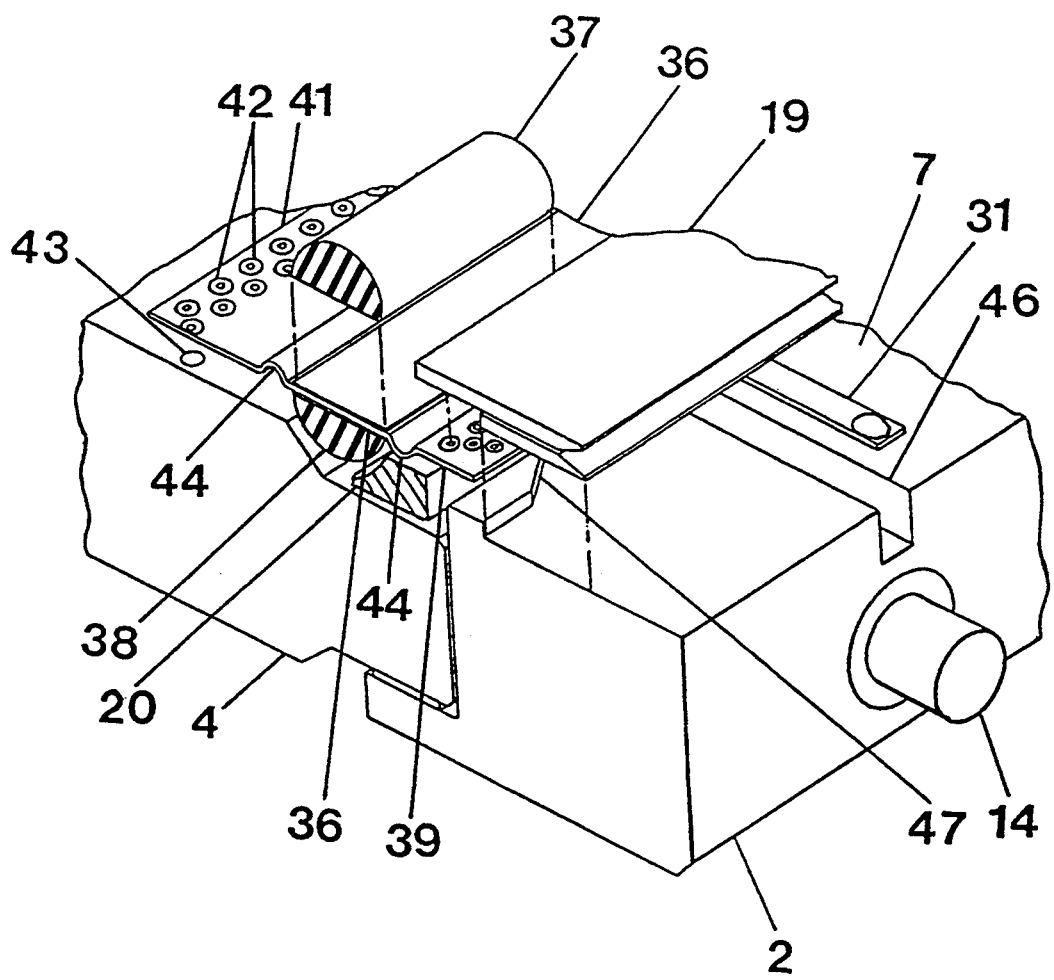
FIG. 4 is a partial exploded view of a through-seal connector interface and several related members.

FIG. 4 illustrates a partial exploded view of the flexible circuit and other related TCM members. The underside of upper silicon member, part of silicon contact actuation structure 19 is soldered to an appropriate pad array 33 on the external flexible printed circuit tab 39. Upper and lower elastomeric seal members 37 and 38 are bonded to upper and lower printed metal lands 36 and 50, respectively. Printed lands 36 and 50 are continuous about the perimeter of flexible circuit member 35. Pad array 33 is connected to appropriate pads 42 on the other side of seal members 37 and 38. Pads 42 have metal spheres soldered central to openings in pad 42 and flexible circuit member 35. The spheres provide points of connection for soldering to pad group 43 on the top surface of alumina substrate 4. The spheres also provide adequate stand off distance to allow solder flux removal by an appropriate rinse operation.

Flexible circuit member 35 has dimpled regions 44 on either side of seal member 37 and 38 to provide stress relief for solder connections to alumina substrate 4 and connector actuation structure 19. The back edge of the lower silicon member of the actuation structure has a tapered protrusion to match the tapered opening 47 at the rear of well 7. Tapered opening 47 maintains actuation member 19 central to well 7 and fixed so that lateral adjustment of pluggable connector member 8 remains valid. Cantilever spring 31 is deflected into slot 46 during insertion of pluggable connector, not shown. Cantilever spring 31 maintains the pluggable connector in contact with a reference surface of lateral adjustment bracket 9, not shown.

Figure 5:
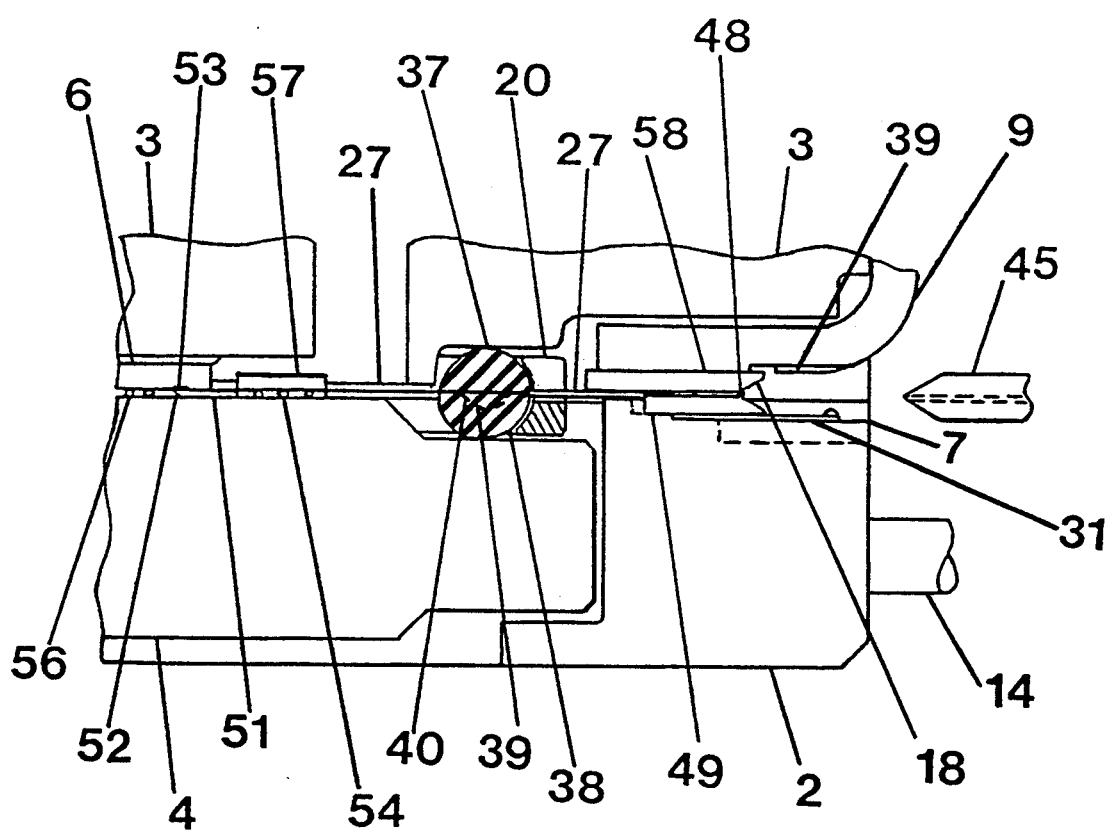
FIG. 5 is an enlarged cross-sectional view of a fiber-optic connector plug prior to insertion into the fiber-optic receptacle by a cam actuation mechanism, part of the lower thermal conduction module (TCM) frame.

FIG. 5 is an enlarged cross-sectional view of the fiber-optic connector system mounted in a well at the separable interface of frame members 2 and 3. During insertion of pluggable fiber-optic connector assembly 45 in slot 7, cantilever spring 31 is compressed to force the forward part of pluggable connector assembly 45 against the reference surface of bracket 9 to maintain engagement of protrusion 32 in guide slot 12. This laterally aligns optical fibers of the pluggable member 45 with the corresponding optical fibers of the receptacle 58. Referring to FIG. 1, clockwise rotation of radial cam 14 fully engages pluggable connector assembly 8 or 45.

The end of optical fiber ribbon cable 27 is stripped of jacketing to expose specified lengths of the optical fibers. The exposed fibers are suitably metallized and soldered into etched v-grooves in silicon members 57 and 58. A cylinder lens 48 is retained in position by soldering its metallized ends to the extremities of the tapered edges 18 of silicon members 58 and 49. Cylinder lens 48 abuts ends of exposed optical fibers of ribbon cable 27.

Continuous seal member 37 has a hemispherical protrusion 39 periodically disposed along its length. Seal element 38 has a corresponding periodic complementing cavity 40 disposed on similar spacing along its length. The hemispherical protrusions engage matching cavities through openings in the optical fiber ribbon cable 27 during adhesive bonding of the upper and lower seal members 37 and 38.

Semiconductor chip 6 is reflow soldered to multichip module 4 with 95% Lead-5% Tin solder balls 56 so that the space between chip 6 and the surface of the multi-chip module is a minimum of 6 mils. This allows the conventional 5 mil diameter optical fibers 51 to be introduced along the edges of the semiconductor chips 6 such that the faceted optical fibers' end faces 52 are aligned for directing optical information to photonic receiver 53 on the semiconductor chips 6. The optical fiber extensions 51 are positioned and dynamically aligned, then the silicon member 57 is reflow soldered to the surface of multi-chip module 4 using eutectic tin/lead solder balls 54.

For applications where photonic receiver 53 would more advantageously be resident on chip 57, or, for the case where a transmitter or transceiver is required for bidirectional lightwave communication, chip 57 can be partitioned into a v-groove carrier along only a segment of its dimension parallel to the direction of the fiber-optic array, and, into a contiguous segment containing transmitters, receivers, or, transceiver disposed transverse to the fiber-optic array. The optical fiber extensions 51 and facets 52 are then eliminated, and, the optical fibers are directly terminated and optically coupled into the photonic devices. Linear arrays of receivers or transmitters can be integrated with the v-grooves of modified chip 57. The controlled collapse chip connection (C4) of chip 57 to the multi-chip module wiring provides all needed electrical power and signal connections for the integration of photonic and logic operations for lightwave communications to and from the optical fiber array.

The upper frame member 3 may be assembled since seal constraint 20 maintains the seal position during seal compression.

Figure 6:
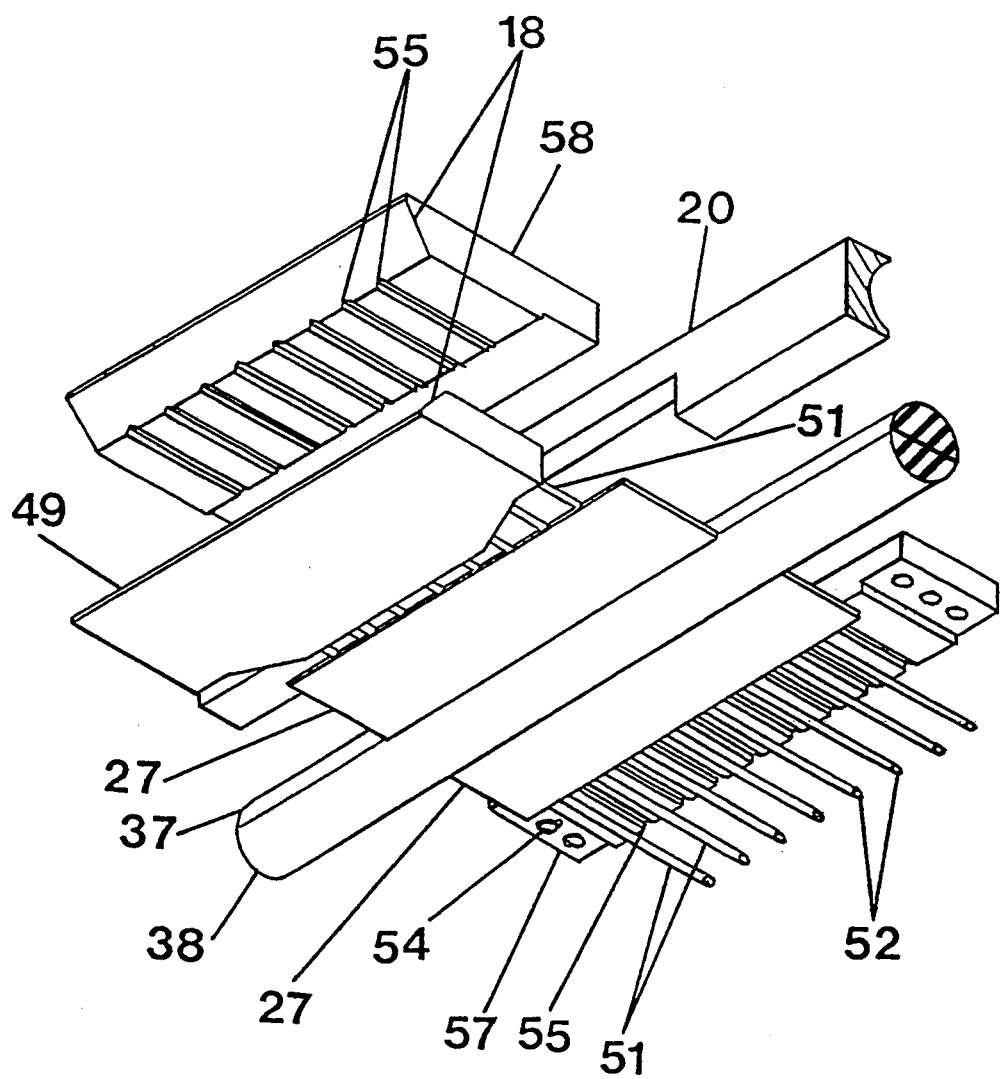
FIG. 6 is a partial exploded view of a through-seal fiber-optic interface and several related members.

FIG. 6 is an exploded view of a section of the seal structure showing an optical fiber receptacle and related elements, suitable for interfacing disconnectable clusters of optical fibers.

Silicon members 58 and 49 are fabricated by conventional semiconductor batch processes. The silicon wafers are etched to produce suitable clusters of v-grooves 55 and inclined surfaces 18.

Selective metallization is applied to permit bonding optical fibers and eutectic solder balls.

It is recognized that semiconductor crystals other than silicon can be preferentially etched to create receptacles and v-groove optical fiber carriers. These alternatives are discussed in U.S. Pat. No. 5,155,786 column 2 by L. Jacobowitz and M. E. Ecker.

In computer processing architectures, data communications and telecommunications switched network fabrics, it is advantageous to provide multi-chip modules with scalable input/output bandwidth, and, to enable pluggable mixes of electrical and optical interconnection in the same module. It is further recognized that important application exist wherein optical and electrical hybrid combinations within the same pluggable connector are advantageous. By virtue of the homologous nature of the receptacle and plug structures and common materials and processes, the present invention enables the full spectrum of all mix and hybrid combination applications.

It should be understood that the above-described embodiments of this invention are presented as examples and not as limitations. Modification may occur to those skilled in the art. Accordingly, the invention is not to be regarded as being limited by the embodiments disclosed herein, but as defined by the appended claims.

Having thus described our invention, what we claim as new and desire to secure by Letters Patent is:

1. A pluggable connector for an electronic module, comprising:
    an electronic module having one or more chips attached to at least one surface of the module,
    a frame surrounding and containing the module,
    a flexible seal located between the frame and the module to surround and contain the module in a gas-tight chamber to reduce contamination of the module from contaminants carried in space exterior to the module,
    at least one connector receptacle fixed in the frame,
    an array of receptacle transmission lines fastened in the connector receptacle and extending through the seal to the module for transmitting signals between the receptacle and a chip of the module, the flexible seal preventing movement of gases to/from the gas-tight chamber upon disengagement of a connector plug from the connector receptacle supported by the frame,
    a connector plug supporting an array of ends of a plurality of external transmission lines, and the connector plug engaging the receptacle external of the frame,
    array alignment means for laterally aligning the array of ends of external transmission lines in V-grooved mating surfaces engaging the connector plug with corresponding ends of receptacle transmission lines in the receptacle connector, and
    independent coefficients of temperature expansion/contraction for the module and for the frame being accommodated by flexing of the receptacle transmission lines on opposite sides of the seal, while maintaining the module in the gas-tight chamber unaffected by engagement and disengagement of the connector plug and the connector receptacle.

2. A pluggable connector for a module as defined in claim 1, further comprising:
    a multiplicity of connector receptacle being provided in the frame, each connector receptacle with a plurality of receptacle transmission lines extending through the seal to the module for transmitting signals between the receptacle and chips associated with the module, and
    means in the module for communicating signals between each receptacle transmission line and a chip of the module.

3. A pluggable connector for a module as defined in claim 2, further comprising:
    a same type of transmission line being used for all receptacle transmission lines for a respective connector.

4. A pluggable connector for a module as defined in claim 3, further comprising:
    different types of transmission lines used by different connectors.

5. A pluggable connector for a module as defined in claim 4, further comprising:
    an optical fiber transmission line type and an electrical transmission line type providing the different types.

6. A pluggable connector for a module as defined in claim 2, further comprising:
    a multiplicity of receptacle openings formed in the frame and containing connector receptacles aligned with one or more edges of the module, and printed circuit wiring passing through the seal to electrically connect contacts in the connector receptacles to module wiring on the surface of the module.

7. A pluggable connector for a module as defined in claim 1, further comprising:
    a single transmission-line type being provided for all external transmission lines supported by the plug, and the same transmission-line type being provided for the receptacle transmission lines.

8. A pluggable connector for a module as defined in claim 7, further comprising:
    an electrical transmission-line type being a single type used for all external transmission lines, and the same electrical-line type being provided for the receptacle transmission lines.

9. A pluggable connector for a module as defined in claim 1, further comprising:
    electrical and optical fiber types of external transmission lines having ends supported by a plug of a hybrid connector, and corresponding types of receptacle transmission lines aligning with the transmission-line ends supported by the plug.

10. A pluggable connector for a module as defined in claim 9, further comprising:
    optical and electrical types of transmission lines being different types of external transmission lines having ends supported by the connector plug, and corresponding transmission-line types being provided for the receptacle transmission lines aligning with the ends supported by the connector plug.

11. A pluggable connector for a module as defined in claim 7, further comprising:
    optical fiber transmission lines being used for all external transmission lines supported by the plug, and the corresponding optical fiber transmission lines being used for all receptacle transmission lines aligning with the ends of the transmission lines supported by the plug.

12. A pluggable connector for a module as defined in claim 1, further comprising:
    the connector plug having a lesser number of external transmission lines than corresponding receptacle transmission lines in the receptacle to allow a variable number of external transmission lines to be used with a single connector design.

13. A pluggable connector for a module as defined in claim 1, further comprising:
   some of the multiplicity of connector receptacles on the frame being hybrid connector receptacles, each hybrid connector receptacles having a connector plug connecting both optical transmission lines and electrical transmission lines to corresponding transmission lines in a mating connector receptacle.

14. A pluggable connector for a module as defined in claim 1, further comprising:
   an array of electrical contacts respectively provided at the ends of the transmission lines in the connector receptacle,
   an array of electrical conductors in the connector receptacle for engaging the array of transmission lines provided to the module, and
   electrical wiring supported through the seal for electrically connecting the contacts of the connector receptacle to the sealed module, and the connector receptacle made of materials having a coefficient of expansion independent of the coefficient of expansion of materials in the module.

15. A pluggable connector for a module as defined in claim 1, further comprising:
   glass-ceramic material structuring the module,
   copper wiring being provided in the module, and
   silicon providing the semiconductor material in the receptacle.

16. A pluggable connector for a module as defined in claim 1, further comprising:
   ceramic material providing a structure material in the module,
   metallic electrical wiring being provided in the module, and
   semiconductor material structuring the connector receptacle.

17. A pluggable connector for a module as defined in claim 1, further comprising:
   alumina material providing the ceramic material in the module,
   molybdenum wiring being provided in the module, and
   silicon providing the semiconductor material in the connector receptacle.

18. A pluggable connector for a module as defined in claim 1, further comprising:
   lateral adjustment means supported in the frame and engagable with the connector plug inserted into the connector receptacle for laterally moving the connector plug relative to the connector receptacle, and
   lateral adjustment means supported by the frame for minutely moving the connector plug within the lateral V-grooved mating surface of the connector receptacle for aligning the transmission-line ends in the connector plug with transmission-line ends in the connector receptacle.

19. A pluggable connector for a module as defined in claim 18, further comprising:
   locking means in the frame having a locked position for holding the connector plug against a frame member in a direction transverse to the lateral V-grooved mating surface to maintain a lateral adjustment between the connector plug and connector receptacle.

20. A pluggable connector for a module as defined in claim 19, the lateral adjustment means further comprising:
   an alignment cam supported by the frame and laterally engaging the connector plug,
   spring means between the frame and the connector plug to present resistance to lateral movement of the connector plug by the alignment cam.

21. A pluggable connector for a module as defined in claim 19, the locking means further comprising:
   a locking cam supported by the frame and engaging the connector plug in a direction transverse to the lateral V-grooved mating surface to maintain a friction force between the connector plug and connector receptacle to prevent movement therebetween.

* * * * *